United States Patent [19]

Buyalos, Jr.

[11] Patent Number: 5,214,872
[45] Date of Patent: Jun. 1, 1993

[54] ADJUSTABLE UMBRELLA BLIND

[76] Inventor: Michael A. Buyalos, Jr., 1669 Forest Glen Cir., Chester, Va. 23831

[21] Appl. No.: 852,359

[22] Filed: Mar. 17, 1992

Related U.S. Application Data

[63] Continuation of Ser. No. 602,028, Oct. 23, 1990, abandoned.

[51] Int. Cl.$^5$ .............................................. A01M 31/00
[52] U.S. Cl. ............................................. 43/1; 135/98; 135/901; 135/75
[58] Field of Search ................ 43/1; 135/98, 99, 114, 135/909, 901, 28, 21, 75; 403/104, 109, 97

[56] References Cited

U.S. PATENT DOCUMENTS

| | | | |
|---|---|---|---|
| Re. 30,605 | 5/1981 | Witt | 43/1 |
| 194,169 | 9/1877 | Pettibone | 135/98 |
| 235,106 | 12/1880 | Steiner | 135/98 |
| 276,791 | 5/1883 | Engle | 135/98 |
| 336,363 | 2/1886 | Ward | 135/98 |
| 558,296 | 4/1896 | McDonald | 135/98 |
| 3,075,252 | 1/1963 | King | 20/2 |
| 3,220,766 | 11/1965 | Kates | 297/184 |
| 3,237,899 | 3/1966 | Lewis | 135/98 |
| 3,406,784 | 10/1968 | Jones et al. | 182/97 |
| 3,455,310 | 7/1969 | Petersen | 135/98 |
| 3,513,605 | 5/1970 | Smith | 52/20 |
| 3,533,376 | 10/1970 | Smith | 119/1 |
| 3,609,905 | 10/1971 | Fuhrman et al. | 43/1 |
| 3,622,201 | 11/1971 | Radig | 297/217 |
| 3,642,318 | 2/1972 | Avant | 297/184 |
| 3,690,334 | 9/1972 | Miller | 135/1 R |
| 3,744,842 | 7/1973 | Ronning | 297/180 |
| 3,760,826 | 9/1973 | Rasmussen | 135/901 |
| 3,787,912 | 1/1974 | Huey, Jr. | 9/5 |
| 3,799,608 | 3/1974 | Smutny et al. | 297/184 |
| 3,902,264 | 9/1975 | Radig | 43/1 |
| 3,913,598 | 10/1975 | Glutting, Jr. et al. | 135/4 R |
| 3,933,164 | 1/1976 | Ness et al. | 135/1 R |
| 4,067,346 | 1/1978 | Husted | 135/4 R |
| 4,070,722 | 1/1978 | Sutherland | 9/5 |
| 4,106,145 | 8/1978 | Gillen et al. | 9/5 |
| 4,123,869 | 11/1978 | Witt | 43/1 |
| 4,164,089 | 8/1979 | George | 43/1 |
| 4,171,595 | 10/1979 | Tucker | 52/2 |

(List continued on next page.)

FOREIGN PATENT DOCUMENTS 1456096 10/1966 France ........................... 135/114
0021364 of 1908 United Kingdom ............ 248/520

OTHER PUBLICATIONS

"Porta Roof 'Magnum'"-Buck Wing Products, Inc. (1989) (2 pages).
Brochure from J-MOE Manufacturing Company.
Catalog clipping entitled "Porta Roof".

*Primary Examiner*—Richard K. Seidel
*Assistant Examiner*—James Miner
*Attorney, Agent, or Firm*—Joseph G. Seeber

[57] ABSTRACT

An adjustable blind for concealing a user comprises a concealing element having a surface defining a plane behind which the user is concealed, a shaft connected to and holding the concealing element, and a support stand positioned on a surface and connected to the shaft for supporting same. The shaft and support stand are interconnected by a bracket, the bracket being adjustable so that the orientation of the shaft relative to the support stand, and thus the orientation of the concealing element relative to the surface, can be varied. The support stand comprises a pair of telescopically mounted elements and a stop mechanism mounted on one of the elements, the positioning of the stop mechanism being adjustable so as to vary the length of the support stand. Other features of the adjustable blind include portability, collapsibility, resistance to reorientation due to wind and adverse elements, provision of observation windows or ports, easy assembly, and provision of a mounting bracket for mounting the blind on a flat surface (such as a tree stand).

23 Claims, 6 Drawing Sheets

U.S. PATENT DOCUMENTS

| | | | |
|---|---|---|---|
| 4,186,507 | 2/1980 | Stinnett | 43/1 |
| 4,224,754 | 9/1980 | Derryberry | 43/1 |
| 4,332,266 | 6/1982 | Wageley | 135/5 R |
| 4,364,193 | 12/1982 | Visco | 43/1 |
| 4,449,542 | 5/1984 | McSwain et al. | 135/98 |
| 4,456,272 | 6/1984 | Kroeger | 280/12 S |
| 4,483,090 | 11/1984 | Carper | 43/1 |
| 4,581,837 | 4/1986 | Powlus | 43/1 |
| 4,671,203 | 6/1987 | Sanburg | 114/361 |
| 4,683,672 | 8/1987 | Davis | 43/1 |
| 4,723,371 | 2/1988 | Williams | 43/1 |
| 4,751,936 | 6/1988 | Zibble et al. | 135/117 |
| 4,761,908 | 8/1988 | Hayes | 43/1 |
| 4,773,437 | 9/1988 | Glutting | 135/117 |
| 4,777,755 | 10/1988 | Colburn | 43/1 |
| 4,782,616 | 11/1988 | Hambleton | 43/1 |
| 4,794,717 | 1/1989 | Horsmann | 43/1 |
| 4,798,019 | 1/1989 | Sury et al. | 43/1 |
| 4,825,799 | 5/1989 | Bergeron et al. | 114/351 |
| 4,833,813 | 5/1989 | McLemore, Jr. | 43/1 |
| 4,926,892 | 5/1990 | Osmonson et al. | 135/909 |

ADJUSTABLE UMBRELLA BLIND

This application is a continuation of application Ser. No. 07/602,028, filed Oct. 23, 1990 now abandoned.

TECHNICAL FIELD

The present invention generally relates to an adjustable blind for concealing a user, and more particularly to a blind which is adjustable both as to its height above the surface on which it is mounted and as to its angular orientation. The adjustable blind is provided with a concealing element, an extended concealing element, and windows or ports along the boundary therebetween.

BACKGROUND ART

Blinds in general, and portable blinds in particular, have been used for many years to conceal an individual and prevent the detection of the individual. Such blinds have been used by hunters, soldiers, observers of wildlife, and others desiring concealment in an outdoor environment. However, such blinds have been characterized by various disadvantages.

Some blinds are difficult and time-consuming to construct. Therefore, they do not offer instant concealment. Other blinds are made up of numerous component parts or heavy component parts, and are therefore difficult to transport. Other blinds do not contain windows or ports so that the user must reveal a portion of his body in order to observe anyone or anything moving in proximity to the blind.

An important disadvantage of blinds of the prior art resides in their lack of flexibility. Specifically, blinds of to prior art are not adjustable both as to the height of the blind and as to the angular orientation of the blind. This lack of flexibility results in the inability of the user of the blind to employ the blind for all positions (e.g., sitting, standing, kneeling). Moreover, such lack of flexibility also prevents the user from employing the same blind for hunting or observing different types of wildlife (e.g., doves or ducks vis-a-vis turkeys or deer).

Thus, it would be considered desirable to develop a portable blind which is easy to assemble, offers instant concealment, is lightweight, and is easy to transport. Moreover, it would also be desirable to develop a blind which is adjustable both as to the height of the blind and the angular orientation of the blind, thus affording the user flexibility in the use of the blind. Finally, such a blind should afford the user with good visibility of the surroundings so as to provide the capability of easy and maximum observation of the surroundings.

The following patents are considered to be typical of the prior art relative to the invention: U.S. Pat. Nos. 3,075,252; 3,220,766; 3,406,784; 3,513,605; 3,533,376; 3,609,905; 3,622,201; 3,642,318; 3,690,334; 3,744,842; 3,787,912; 3,799,608; 3,902,264; 3,913,598; 3,933,164; 4,067,346; 4,070,722; 4,106,145; 4,123,869; 4,164,089; 4,171,595; 4,186,507; 4,224,754; 4,332,266; 4,364,193; 4,449,542; 4,456,272; 4,483,090; 4,581,837; 4,671,203; 4,683,672; 4,723,371; 4,751,936; 4,761,908; 4,773,437; 4,777,755; 4,782,616; 4,794,717; 4,798,019; 4,825,799; 4,833,813; and Re. U.S. Pat. No. 30,605.

In addition, various blinds are fabricated and sold by J-Moe Manufacturing Company of Clay, New York. Furthermore, a portable blind is manufactured and marketed under the name of PORTA ROOF "MAGNUM" (PORTA ROOF is a registered trademark of Buck Wing Products, Inc. of Allentown, Pennsylvania).

DISCLOSURE OF INVENTION

The invention generally relates to an adjustable blind, and more particularly to a blind which is adjustable both as to its height and as to its angular orientation relative to the surface on which it is positioned.

Basically, the adjustable blind of the present invention comprises a concealing element formed by a modified umbrella or similar arrangement, the concealing element being held by a shaft. The shaft is supported by a bracket and is adjustable within the bracket so that the angular orientation of the concealing element and shaft may be varied quickly, easily and quietly in accordance with the particular type of wildlife being hunted or observed.

The shaft and bracket are, in turn, supported by a support stand. The support stand comprises a top portion telescopically mounted with respect to a bottom portion, the bottom portion carrying a stop, the position of which is adjustable. In this manner, the length of the support stand, and thus the height of the concealing element with respect to the surface on which it is mounted, can be varied quickly, easily and quietly.

Other features of the adjustable blind include provision of a lightweight arrangement, an arrangement which is easily transportable, an arrangement which is easy and quick to assemble, an arrangement which provides instant concealment of the user, and an arrangement which provides the user with the capability of viewing the surroundings via ports or windows provided in the concealing element.

Therefore, it is a primary object of the present invention to provide a blind for use by hunters or observers of wildlife.

It is an additional object of the present invention to provide a blind which is adjustable both as to its angular orientation and as to its height with respect to the surface on which it is mounted.

It is an additional object of the present invention to provide a blind comprising a modified umbrella-type concealing element supported by a shaft mounted in and adjustable within a bracket, thereby providing variation in the angular orientation of the concealing element.

It is an additional object of the present invention to provide an adjustable blind comprising a modified umbrella-type concealing element supported by a support stand, the support stand being adjustable so as to vary the height of the concealing element above the surface on which it is mounted.

It is an additional object of the present invention to provide a blind comprising a modified umbrella-type concealing element supported by a support stand, the blind being adjustable so that the direction of the blind is changed quickly, easily, and quietly.

It is an additional object of the present invention to provide a blind which is portable, lightweight, easily transportable, and easy to assemble, and which provides instant concealment of the user.

It is an additional object of the present invention to provide a blind which has viewing windows or ports for use by the user in viewing the surroundings.

The above and other objects, and the nature of the invention, will be more clearly understood by reference to the following detailed description, the accompanying drawings, and the appended claims.

BEST MODE FOR CARRYING OUT THE INVENTION

The invention will now be described in more detail by reference to the accompanying drawings.

Figure 1:
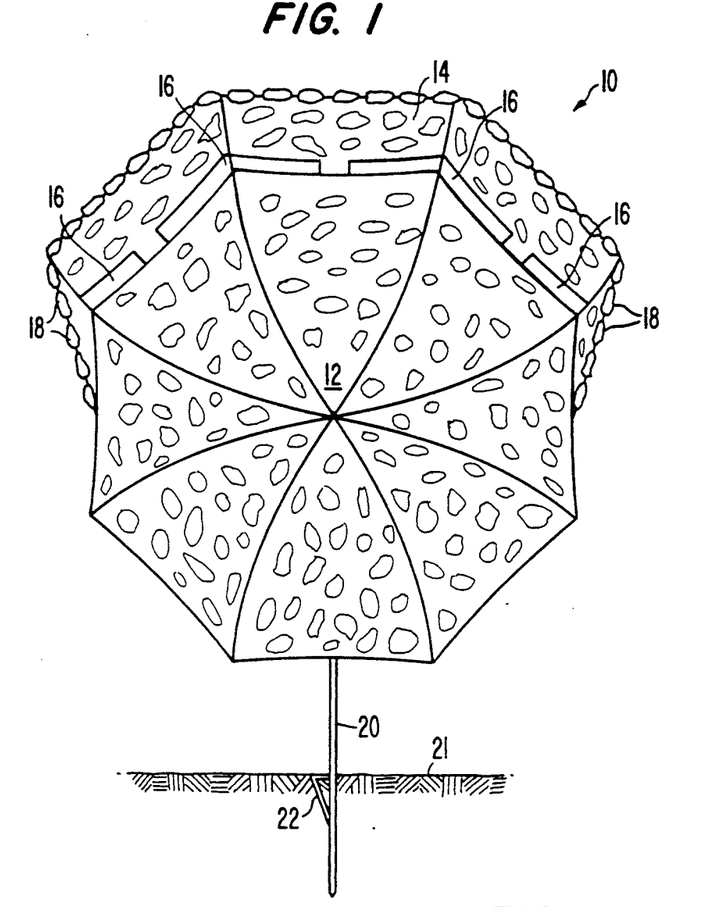
FIG. 1 is a front view of the adjustable blind of the present invention.

FIG. 1 is a front view of the adjustable blind of the present invention. As seen therein, the blind 10 comprises a main concealing element 12, an extended concealing element 14, windows or ports 16, leaf-like material 18, support stand 20, and gusset 22.

In a preferred embodiment of the invention, the main concealing element 12 comprises an umbrella-type arrangement. The umbrella-type arrangement is modified in several respects. An extended concealing element 14 is positioned on the upper half of the perimeter of the main concealing element 12, and windows or ports 16 are provided along the boundary between the main concealing element 12 and the extended concealing element 14. Preferably, the windows or ports 16 are formed in the bottom portion of the extended concealing element 14 (as seen in FIG. 1), and have rough edges.

The front surfaces of the main concealing element 12 and the extended concealing element 14 are, preferably, of a camouflage-type color and pattern. The upper perimeter of the extended concealing element 14 is, preferably, provided with leaf-like material 18 stitched to the perimeter or edge of the element 14.

Finally, the blind 10 is generally supported by a support stand 20 having a gusset 22, the end of the support stand 20 being pushed into the ground 21 in order to mount the blind 10 for ground use. The gusset 22 is provided for the purposes of pushing the support stand 20 into the ground with the user's foot and of keeping the support stand 20 from turning in the ground 21 due to the pressure of wind on the main concealing element 12 and extended concealing element 14 of the blind 10. The gusset 22 of the blind 10 may also be used to mount the blind 10 on any other surface, such as on a tree stand, and this is explained below with reference to FIG. 9.

Figure 2A:
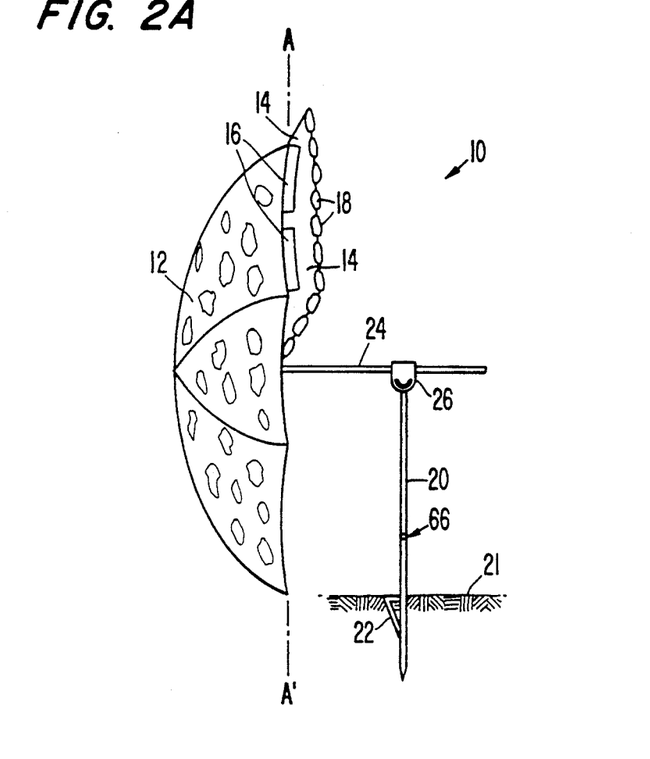
FIG. 2A is a side view of the adjustable blind in a partially installed state and FIG. 2B is a side view of the adjustable blind in a fully installed state, the blind being oriented so that the plane of the main concealing element forms a right angle with the surface on which the blind is mounted.
Figure 3A:
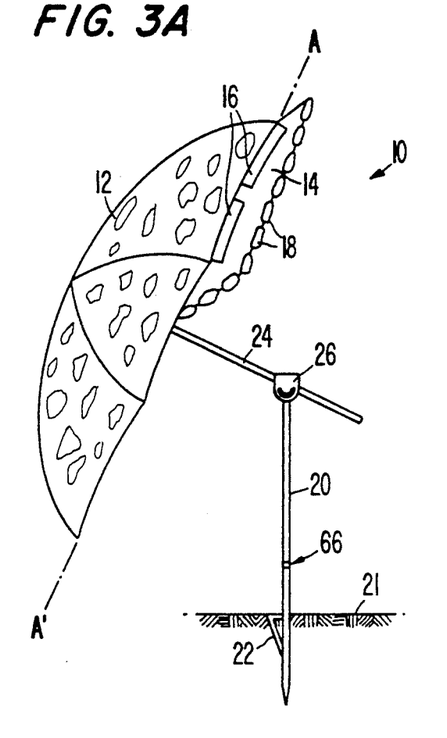
FIG. 3A is a side view of the blind in a partially installed state and FIG. 3B is a side view of the blind in a fully installed state, wherein the main concealing element is oriented so that its plane forms an acute angle (less than 90 degrees) with respect to the surface on which the blind is mounted.

FIG. 2A is a side view of the adjustable blind 10 in a partially installed state and oriented so that the plane A—A' of the main concealing element 12 forms a right angle with the surface on which the blind 10 is mounted. FIG. 3A is a side view of the adjustable blind 10 in a partially installed state, wherein the main concealing element 12 is oriented so that its plane A—A' forms an acute angle (less than 90 degrees) with respect to the surface on which the blind 10 is mounted.

As seen in FIGS. 2A and 3A, the blind 10 additionally comprises a shaft 24 mounted in a bracket 26, the bracket 26 being disposed at the top portion of the support stand 20. The orientation of the shaft 24 within the bracket 26 is, in accordance with the invention and in a manner to be described in more detail below, adjustable so that the plane of main concealing element 12 and associated elements 14, 16 and 18 is oriented generally at a right angle with respect to the ground 21, as shown in FIG. 2A. This position provides the user with good observation of any wildlife (such as turkeys and deer) moving along the ground. As shown in FIG. 3A, the orientation of the shaft 24 can be adjusted so that the main concealing element 12 and associated elements 14, 16 and 18 are generally oriented at an acute angle (less than 90 degrees) relative to the ground 21. This provides the user with the capability of observing, via the windows 16, any wildlife moving through the air (such as ducks and other flying wildlife).

Figure 2B:
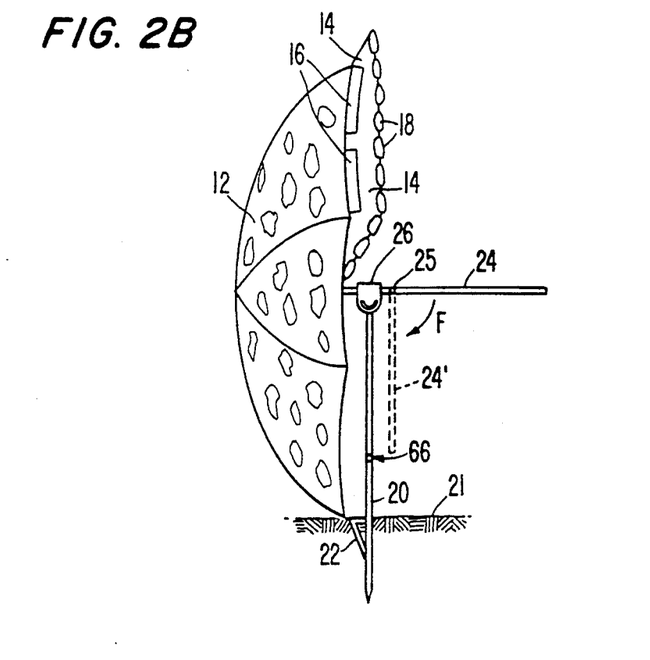
Figure 3B:
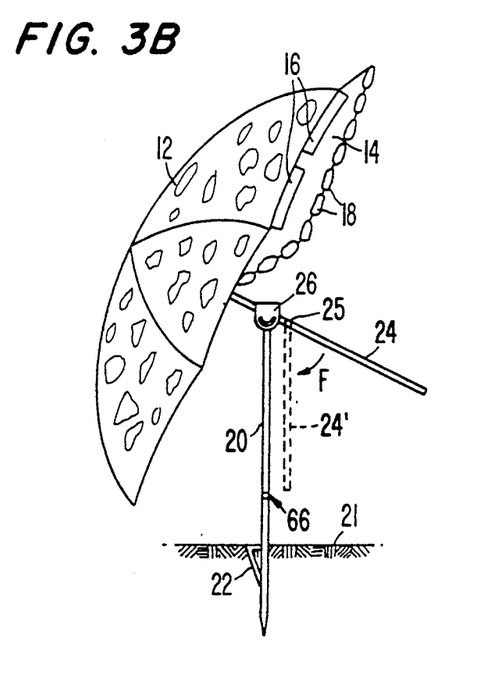

Once the angular orientation, height and direction of the blind 10 are set (as described in more detail below), the shaft 24 is slid through the bracket 26 until the concealing element 12 is in close proximity to support stand 20, as seen in FIGS. 2B and 3B. The bracket 26 is then tightened around shaft 24. Preferably, shaft 24 is provided with a hinge or folding joint 25 located on the other side of bracket 26 relative to concealing element 12 (see FIGS. 2B and 3B). Accordingly, the end portion of shaft 24 can be lowered into a vertical position parallel to support stand 20, as indicated by the dotted lines 24' in FIGS. 2B and 3B, so as not to impede the user in movement behind the blind 10 and so to make the assembled blind 10 less top-heavy.

As an alternative to folding of the shaft 24, the shaft 24 may be fabricated in two sections joined at point 25 in FIGS. 2B and 3B, the end portion being slightly lesser in diameter than the portion nearest concealing element 12. In this manner, the end portion can be telescopically slid into the other portion and locked in place by a suitable device (not shown), thus accomplishing the same beneficial results as accomplished by folding.

Figure 4:
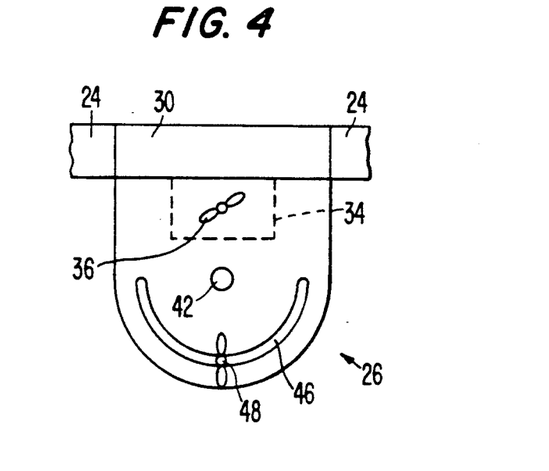
FIG. 4 is a side view of the bracket in which the shaft of the blind is held and adjusted.
Figure 5:
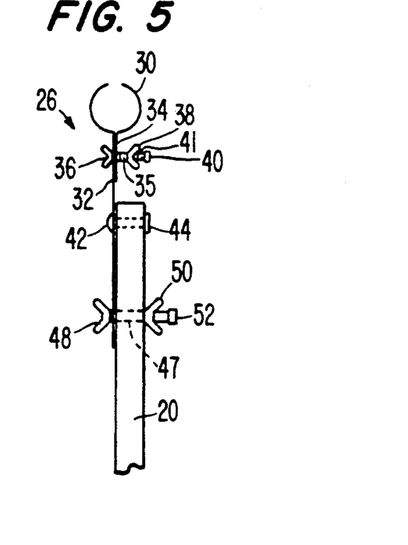
FIG. 5 is a front view of the bracket of FIG. 4, as mounted on the support stand of the blind of the present invention.

FIG. 4 is a side view of the bracket in which the shaft of FIGS. 2A and 3A, 3B is held and adjusted, while FIG. 5 is a front view of the bracket, as mounted on a top portion of the support stand of the blind.

As seen in FIGS. 4 and 5, the bracket 26 comprises a shaft holder 30 in which the shaft 24 is mounted, a front plate 32, a rear plate 34, spacer 35, wing nuts 36 and 38, lock nut 40, threaded member 41, bolt 42, lock nut 44, arc-like opening 46, threaded member 47, wing nuts 48 and 50, and lock nut 52.

Shaft holder 30 is a generally cylindrical portion of the bracket 26, in which cylindrical portion the shaft 24 is held. Preferably, the shaft holder 30 is open at the top so as to facilitate tightening of the holder 30 around the shaft 24. In addition, during manufacture, the internal surface of the shaft holder 30 is roughened so as to facilitate gripping of the shaft 24 disposed therein, thereby preventing the shaft 24 from turning during use of the adjustable blind 10. When the shaft 24 is inserted into the shaft holder 30 during the assembly process, secure gripping of the shaft 24 by the holder 30 is achieved by the user's inserting a threaded member 41 through plates 34 and 36, placing a spacer 35 over the threaded member, and then tightening wing nuts 36 and 38 on the threaded member. In this manner the front plate 32 is pressed against the rear plate 34. Horizontal spacing between the wing nuts 36 and 38 is achieved by placing the spacer 35 over the threaded member 41 in sleeve-like fashion, the spacer 35 providing finger room for user manipulation of the wing nuts 36 and 38. Lock nut 40 is locked in place on the end of the threaded member 41 to prevent possible loss of these elements during use or during transportation prior to or after use.

The bracket 26 is secured to a top portion of the support stand 20 by coaction of bolt 42 and lock nut 44. In addition, threaded member 47 and wing nuts 48 and 50 are employed to secure bracket 26 to the top portion of support stand 20, threaded member 47 and wing nuts 48 and 50 providing the additional capability of adjusting the angular orientation of the shaft 24 relative to support stand 20, and thus the angular orientation of the main concealing element 12 and associated elements 14, 16 and 18 (FIGS. 1 thru 3A) relative to the ground 21 (or other surface on which the blind 10 is mounted).

More specifically, threaded member 47 is inserted through the arc-like opening 46 and through the upper portion of support stand 20, with wing nuts 48 and 50 being screwed onto respective ends of threaded member 47. The angular orientation of bracket 26 and shaft 24 held by it can then be adjusted by rotating the bracket 26 about bolt 42 and lock nut 44 as a pivot point. Once the desired orientation is achieved, wing nuts 48 and 50 are tightened so as to hold the bracket 26 in the desired orientation. Lock nut 52 serves the purpose of preventing wing nuts 48 and 50 from being lost during transportation before or after use.

It should be noted that lock nuts 40, 44 and 52 can be any type of lock nut for performing the functions described above. In fact, lock nuts 40, 44 and 52 are, preferably, soldered in place once they are positioned on their respective adjacent elements.

Figure 6:
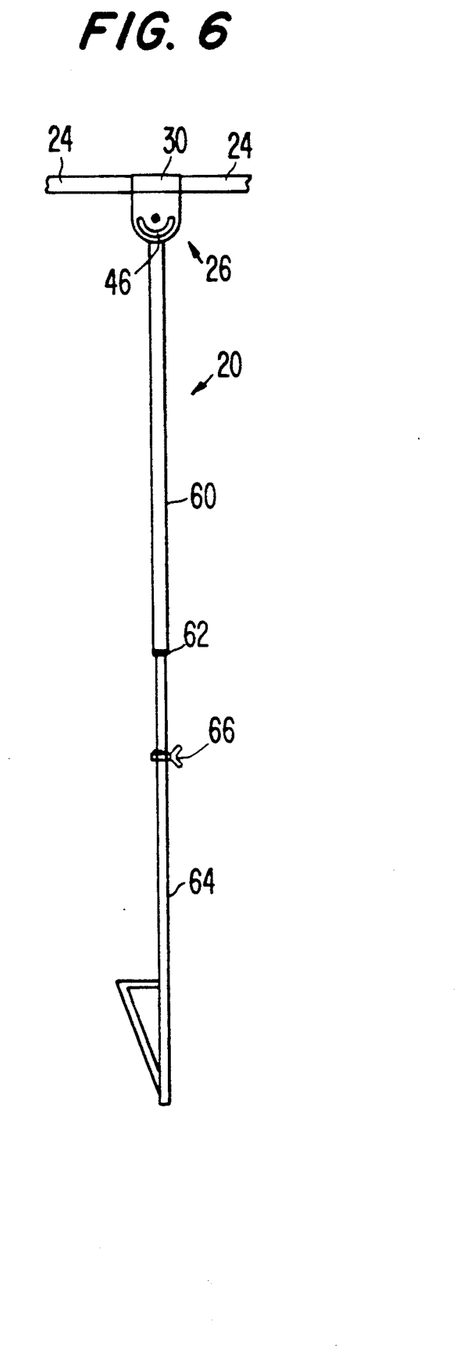
FIG. 6 is a side view of the adjustable bracket and support stand of the blind of the present invention.
Figure 7:
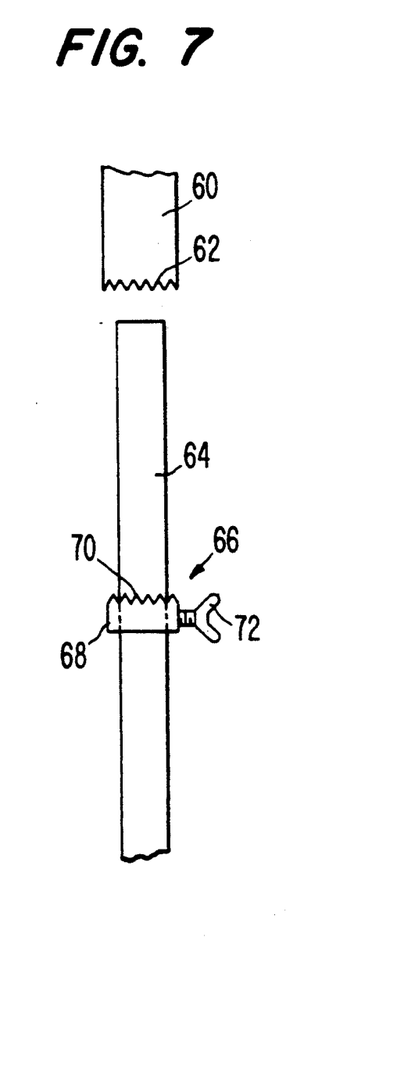
FIG. 7 is a side view of the mechanism by means of which the length of the support stand of the blind of the present invention is adjusted.

FIG. 6 is a side view of the adjustable bracket and support stand of the adjustable blind, while FIG. 7 is a side view of the mechanism by means of which the length of the support stand of the blind is adjusted.

As seen in FIGS. 6 and 7, support stand 20 comprises a top portion 60 having a serrated lower edge 62, and a bottom portion 64 provided with a stop 66. The stop 66 comprises a metal or steel band or clasp 68 having a serrated upper edge 70 and a locking screw 72.

In order to assemble or adjust the height of the support stand 20, top portion 60, which has an internal diameter slightly larger than the external diameter of bottom portion 64, is slid telescopically over bottom portion 64. The stop 66 is positioned on bottom portion 64 at such a height above ground or surface level as to achieve a desired height of bracket 26 above ground or surface level once the serrated lower edge 62 of top portion 60 comes to rest against the stop 66. Once the stop 66 is positioned at a desired height on bottom portion 64, it is locked into place by tightening locking screw 72. Then, top portion 60 is lowered telescopically over bottom portion 64 until the serrated lower edge 62 of top portion 60 comes to rest against the serrated upper edge 70 of the band or clasp 68. This mating of the serrated lower edge 62 and serrated upper edge 70 secures and stabilizes the support stand 20 so that, despite wind or other pressure which might cause the main concealing element 12 and associated elements 14, 16, 18 and 24 to rotate about the support stand 20, no rotation takes place. Thus, the horizontal orientation or direction of the blind 10 is maintained, even in adverse, windy circumstances.

Finally, once the blind 10 is assembled, the orientation or direction of the blind 10 can be easily adjusted. The user merely slides the top portion 60 upward to disengage the serrated portions 62 and 70, rotates the top portion 60 sufficiently to establish a new direction for the blind 10, and then lowers the top portion 60 onto the stop 66 so as to reengage the serrated portions 62 and 70.

Figure 8:
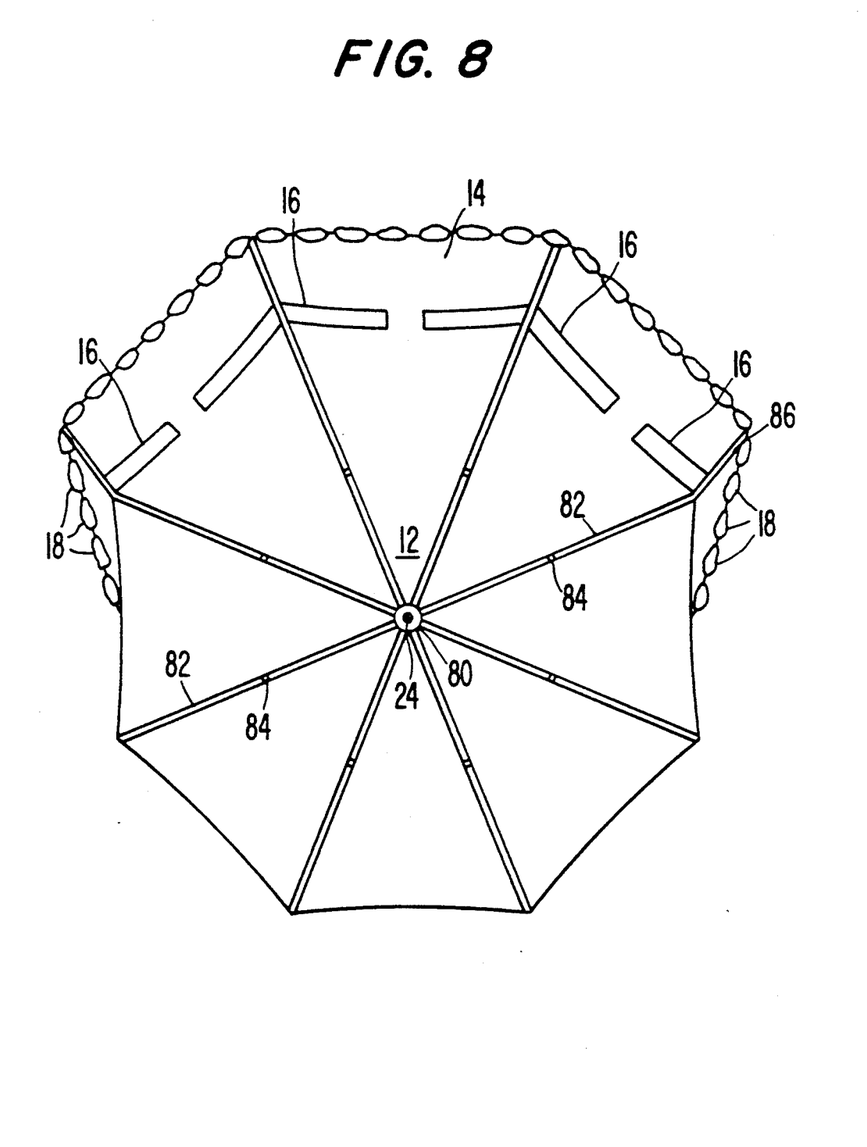
FIG. 8 is a rear view of the adjustable blind of the present invention, taken along a section line corresponding to plane A—A' of FIG. 2A.

FIG. 8 is a rear view of the main concealing element 12 and associated elements 14, 16 and 18, as taken along a section line corresponding to plane A—A' of FIG. 2A. As seen therein, preferably, the blind 10 is formed by an umbrella-type arrangement.

Specifically, a metal ring 80 is disposed around the outside perimeter of the shaft 24, and ribs 82 are connected to and radiate from the ring 80. The ends of ribs 82 are connected to the outer portion of the main concealing element 12 and support the main concealing element 12 in umbrella-type fashion. Additional rib portions 8 extend from four of the ribs 82 and are fixed to the outer portion of extended concealing element 14 so as to support element 14. Of course, the four upper ribs 82 and their associated rib portions 86 can be combined into four single ribs extending from ring 80 and attached to both the outer portion of main concealing element 12 and the outer portion of extended concealing element 14, or to the outer portion of extended concealing element 14 only.

The blind 10 is erected by merely opening elements 12 and 14 in umbrella-type fashion, the ring 80 being slid outwardly along the shaft 24 until a conventional umbrella lock mechanism (not shown) is encountered and locks the ring 80 in its extended position. Conversely, the blind 10 can be disassembled by merely pressing on the conventional umbrella lock mechanism (not shown) so as to release the ring 80, permitting it to be withdrawn along the shaft 24, thereby collapsing the elements 12 and 14 (and associated elements). For the purpose of facilitating the opening and collapsing of elements 12 and 14, preferably, ribs 82 are provided with hinges 84 at approximately their mid-point, thereby permitting ribs 82 to bend in hinge-like manner as the blind 10 is collapsed. Once the blind 10 is collapsed, it can be inserted into an appropriate carrying case. For that purpose, preferably, a very lightweight, flexible cloth carrying case with shoulder straps and zipper closure can be provided or obtained.

Figure 9:
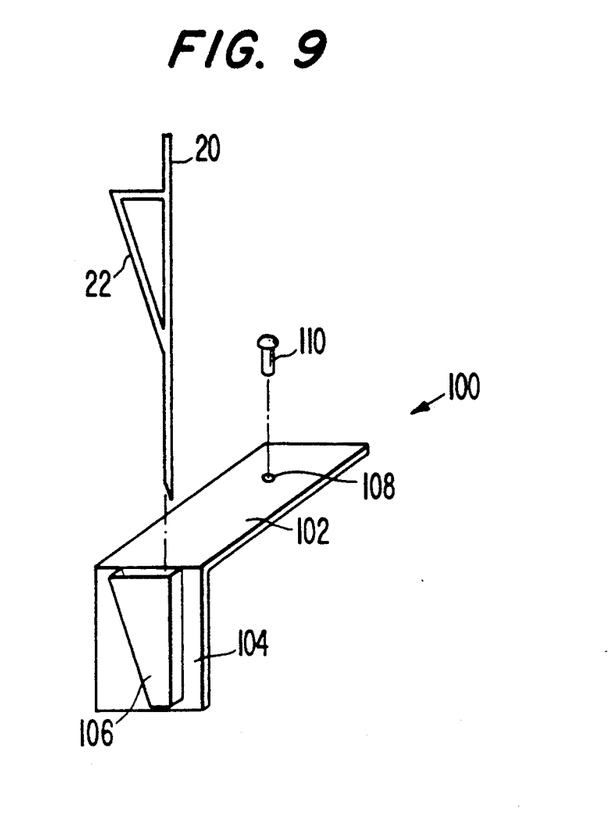
FIG. 9 is a perspective view of a mounting bracket for use in maintaining the blind on a surface, such as a tree stand.

FIG. 9 is a perspective view of a mounting bracket for use in mounting the blind on a surface, such as a tree stand. As seen therein, the bracket 100 comprises a flat portion 102, right-angle portion 104, slot 106, hole 108 and a bolt 110.

The mounting bracket 100 is, preferably, made of steel or similar material and is mounted on a surface, such as a tree stand. Specifically, the flat portion 102 is positioned on the front edge of a tree stand so that right-angle portion 104 hangs over the edge of the tree stand. The bracket 100 is then secured in place by any suitable securing mechanism or device, such as the bolt 110 (inserted into hole 108). Once the bracket 100 is secured, the shaft 20 is lowered into slot 106 until gusset 22 comes to rest in slot 106. The blind 10 is then assembled as previously described.

Figure 10:
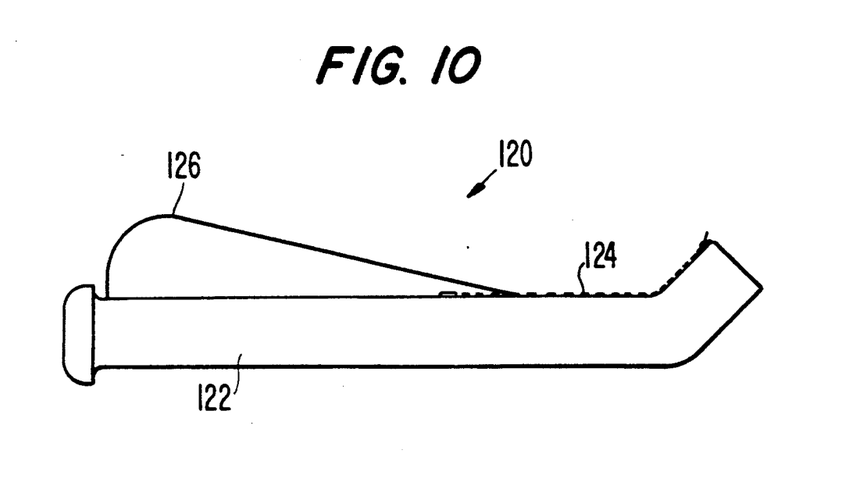
FIG. 10 is a side view of a carrying case in which the disassembled blind is carried.

Finally, FIG. 10 is a side view of a carrying case in which the blind 10, when in a disassembled state, is carried by the user. Preferably, the case 120 comprises a main portion 122 having a zippered opening 124 through which the disassembled blind 10, resembling a folded umbrella, is inserted. The case 120 is also provided with a shoulder strap 126 for ease in carrying the blind 10.

While preferred forms and arrangements have been shown in illustrating the invention, it is to be understood that various changes in detail and arrangement may be made without departing from the spirit and scope of this disclosure.

I claim:

1. A device for concealing a user, comprising:
   concealing means for concealing the user and having a surface defining a plane;
   shaft means connected to said concealing means and oriented in a direction substantially perpendicular to the plane for holding said concealing means; and
   support means positioned on a further surface for supporting said shaft means;
   wherein said support means comprises a bottom portion having a cross-section of first diameter and a top portion having a cross-section of second diameter greater than the first diameter, said top portion being telescopically mounted on said bottom portion; and
   wherein said device further comprises a stop mounted circumferentially on said bottom portion, said top portion resting on said stop when said top portion is telescopically mounted on said bottom portion; and
   wherein said stop comprises a metal band having an upper edge which is serrated, said top portion having a lower edge which is serrated, whereby said top portion is secured against rotation when said top portion rests on said stop.

2. The device of claim 1, wherein said stop further comprises locking screw threadably connected to and passing through said metal band, said locking screw bearing against said bottom portion and fixing said metal band in position relative to said bottom portion when tightened.

3. The device of claim 1, wherein said stop is mountable at any point along said bottom portion, whereby the length of said support means is adjustable.

4. The device of claim 1, further comprising adjusting means connecting said shaft means to said support means, and operable by the user for adjusting the orientation of said shaft means so as to vary the orientation of the plane relative to the further surface.

5. The device of claim 4, wherein said adjusting means comprises a bracket having a first portion for holding said shaft means and a second portion for holding said support means.

6. The device of claim 5, wherein said shaft means comprises a cylindrical shaft and said first portion comprises a cylindrically shaped element for holding said cylindrical shaft.

7. The device of claim 6, wherein said first portion includes wing nut means for tightening said cylindrically shaped element around said cylindrical shaft.

8. The device of claim 7, wherein said wing nut means comprises a threaded member, a spacer disposed thereon, a first wing nut disposed on a first end of said threaded member, and a second wing nut disposed on a second end of said threaded member.

9. The device of claim 6, wherein said cylindrically shaped element has an internal surface which is roughened to grip and securely hold said cylindrical shaft.

10. The device of claim 2, wherein said support means comprises an elongate element having an end pivotably connected to said second portion.

11. The device of claim 10, wherein said second portion has an arc-shaped opening formed therein, said adjusting means further comprising a member extending through said elongate element and through said arc-shaped opening.

12. The device of claim 11, wherein said adjusting means further comprises at least one wing nut threadably connected to said member for tightly securing said member within said arc-shaped opening.

13. The device of claim 12, wherein said at least one wing nut comprises first and second wing nuts, said first wing nut being disposed on a first end of said member, said second wing nut being disposed on a second end of said member and located on a side of said elongate element remote from said arc-shaped opening.

14. A device for concealing a user, comprising:
    concealing means for concealing the user and having a surface defining a plane;
    shaft means connected to said concealing means and oriented in a direction substantially pependicular to the plane for holding said concealing means; and
    support means positioned on a further surface for supporting said shaft means;
    wherein said support means comprises a bottom portion having a cross-section of first diameter and a top portion having a cross-section of second diameter greater than the first diameter, said top portion being telescopically mounted on said bottom portion;
    said device further comprising stop means mounted on and encircling said bottom portion for supporting said top portion and for securing said top portion against rotation; and
    wherein said stop means comprises a metal band having an upper edge which is serrated, said top portion having a lower edge which is serrated, whereby said top portion is secured against rotation when said top portion rests on said metal band.

15. A device mountable on a tree stand for concealing a user positioned on the tree stand, comprising:
    concealing means for concealing the user and having a surface defining a plane;
    shaft means connected to said concealing means and oriented in a direction substantially perpendicular to the plane for holding said concealing means; and
    support means connected to said shaft means for supporting said shaft means;
    wherein the tree stand comprises a flat surface of sufficient size to accommodate the user positioned on said flat surface, said device including mounting bracket means for mounting said support means on the flat surface; and wherein the flat surface on which said support means is mounted has an edge, said mounting bracket means comprising an L-shaped element having a first flat portion positioned on the flat surface, a second flat portion integrally connected to and generally perpendicular to the first flat portion and extending downwardly below the flat surface, and slot means disposed on the second flat portion and forming a receptacle for receiving and holding said support means, said mounting bracket means further comprising a bolt-type connector passing through said first flat portion into said flat surface and connecting said L-shaped element to said flat surface; and wherein said first flat portion of said L-shaped element is elongated so as to extend substantially past the edge of the flat surface and in a generally horizontal direction to a point at which said second flat portion is connected to said first flat portion, whereby said second flat portion, said slot means and said support means are spaced apart from the edge of the flat surface on which said support means is mounted, thereby providing ample room for the user to be positioned on said flat surface of the tree stand and to function behind said concealing means.

16. The device of claim 15, wherein said support means has a triangularly shaped distal end, and said slot means comprises a downwardly pointing triangularly shaped slot forming a vertically tapered receptacle for receiving and holding said triangularly shaped distal end of said support means.

17. A device for concealing a user, comprising:
concealing means for concealing the user and having a surface including a periphery, said periphery defining a plane,
shaft means having a first end connected to said concealing means and a second end, said shaft means being oriented in a direction substantially perpendicular to the plane for holding said concealing means,
support means having a first end connected to said second end of said shaft means, said support means having a second end positionable on a surface for supporting said device, and
adjusting means for adjusting the angular orientation of said concealing means relative to said surface, said adjusting means interconnecting said shaft means and said support means;
said concealing means comprising:
a main concealing element behind which the user is concealed, said main concealing element having a periphery corresponding to the periphery of said surface, and
an extended concealing element connected to at least a portion of said periphery of said main concealing element so as to define a boundary between said main concealing element and said extended concealing element;
wherein at least one opening is formed in the vicinity of said boundary so as to provide the user with a means for viewing objects in front of said main concealing element of said device.

18. The device of claim 17, wherein said at least one opening is formed in said extended concealing element.

19. The device of claim 17, wherein said at least one opening has interior edges which are rough.

20. The device of claim 17, wherein said at least one opening comprises a plurality of openings.

21. The device of claim 17, wherein said main concealing element comprises an umbrella-shaped structure.

22. A device for concealing a user, comprising;
concealing means for concealing the user and having a surface defining a plane;
shaft means connected to said concealing means and oriented in a direction substantially perpendicular to the plane for holding said concealing means;
support means positioned on a further surface for supporting said shaft means; and
adjusting means connecting said shaft means to said support means, and operable by the user for adjusting the orientation of said shaft means so as to vary the orientation of the plane relative to the further surface;
wherein said adjusting means comprises an element through which an end portion of said shaft means is inserted; and
wherein said end portion of said shaft means includes hinge means for folding said end portion of said shaft means when said device is assembled.

23. The device of claim 22, wherein said shaft means includes first and second portions having first and second diameters, respectively, the first diameter being greater than the second diameter, whereby said second portion is slid into said first portion when said device is assembled.

* * * * *

UNITED STATES PATENT AND TRADEMARK OFFICE
CERTIFICATE OF CORRECTION

PATENT NO. : 5,214,872

DATED : June 1, 1993

INVENTOR(S) : Michael A. Buyalos, Jr.

It is certified that error appears in the above-identified patent and that said Letters Patent is hereby corrected as shown below:

Claim 10, column 8, line 16, "2" should read "5".

Signed and Sealed this

Fourteenth Day of December, 1993

Attest:

BRUCE LEHMAN

Attesting Officer     Commissioner of Patents and Trademarks